(12) United States Patent
Strawn et al.

(10) Patent No.: US 7,548,761 B2
(45) Date of Patent: Jun. 16, 2009

(54) RADIOTELEPHONE

(75) Inventors: Andrew Strawn, Hampshire (GB); Phil Bateman, Berkshire (GB); Robert Strafford, Hampshire (GB)

(73) Assignee: Nokia Mobile Phones Limited, Espoo (FI)

( * ) Notice: Subject to any disclaimer, the term of this patent is extended or adjusted under 35 U.S.C. 154(b) by 657 days.

(21) Appl. No.: 09/852,630

(22) Filed: May 11, 2001

(65) Prior Publication Data

US 2001/0049292 A1 Dec. 6, 2001

(30) Foreign Application Priority Data

May 26, 2000 (GB) .................................. 0012951.0

(51) Int. Cl.
*H04M 1/00* (2006.01)
(52) U.S. Cl. ................ 455/550.1; 455/90.3; 455/575.1; 455/575.8
(58) Field of Classification Search ................ 455/90.3, 455/575.1, 575.3, 575.4, 575.8, 550.1; 248/221.11, 248/220.12, 222.13, 288.51, 917; 361/679–686; 312/319.2, 223.2; 292/288
See application file for complete search history.

(56) References Cited

U.S. PATENT DOCUMENTS

| | | | | |
|---|---|---|---|---|
| 4,719,322 A * | 1/1988 | Guzik et al. ................. | 200/5 A |
| 5,507,013 A * | 4/1996 | Weadon et al. ........... | 455/575.3 |
| 5,732,331 A * | 3/1998 | Harms ..................... | 455/575.3 |
| 5,933,330 A * | 8/1999 | Beutler et al. ............... | 361/814 |
| 5,955,700 A | 9/1999 | Slipy et al. | |
| 6,073,027 A * | 6/2000 | Norman et al. .......... | 455/575.4 |
| 6,088,240 A * | 7/2000 | Steinhoff et al. ............ | 361/814 |
| 6,118,986 A * | 9/2000 | Harris et al. ............. | 455/575.3 |
| 6,226,501 B1 * | 5/2001 | Weadon et al. ........... | 455/575.3 |
| 6,347,218 B1 * | 2/2002 | Fuhrmann et al. .......... | 455/90.1 |
| 6,353,733 B1 * | 3/2002 | Murray et al. ............. | 455/90.1 |
| 6,397,078 B1 * | 5/2002 | Kim ........................ | 455/556.2 |
| 6,430,400 B1 * | 8/2002 | MacDonald, Jr. et al. .. | 455/90.1 |
| 6,490,436 B1 * | 12/2002 | Kaiwa et al. ............... | 455/90.1 |
| 6,847,806 B2 | 1/2005 | Curtis et al. | |

(Continued)

FOREIGN PATENT DOCUMENTS

DE 43 07 164 A1 9/1994

(Continued)

*Primary Examiner*—George Eng
*Assistant Examiner*—Marcos L Torres
(74) *Attorney, Agent, or Firm*—Alston & Bird LLP

(57) ABSTRACT

An electronic radiotelephone comprising a first and second housing for housing the electronic components of the radiotelephone; the first housing having a element with an operating surface and a formation which cooperates with a complementary formation on the second housing for releasably attaching the first housing to the second housing; the element being movable between a first and a second position such that when the element is in the first position the formation and complementary formation to co-operate to allow the first housing to be coupled to the second housing and when in the second position allow the second housing to be removed from the first housing; the element being resiliently biased into the first position and allowing a user to urge the element, via the operating surface, into the second position during the removal of the second housing from the first housing, thereby allowing the second housing to be removed from the first housing without interference from the element.

13 Claims, 4 Drawing Sheets

U.S. PATENT DOCUMENTS

| | | | |
|---|---|---|---|
| 6,889,139 B2 * | 5/2005 | Prabhakaran | 701/213 |
| 2002/0039890 A1 * | 4/2002 | Kim | 455/90 |
| 2002/0042285 A1 * | 4/2002 | Sakata et al. | 455/550 |
| 2002/0102946 A1 * | 8/2002 | SanGiovanni | 455/90 |

FOREIGN PATENT DOCUMENTS

| | | |
|---|---|---|
| EP | 0806857 | 11/1997 |
| GB | 2305810 | 4/1997 |
| GB | 2346759 | 8/2000 |
| GB | 2358744 | 1/2001 |
| JP | 2001-217566 | 8/2001 |
| WO | WO 97/32424 | 9/1997 |
| WO | WO 99/66752 | 12/1999 |
| WO | WO 99/66752 A1 | 12/1999 |
| WO | WO 00/13330 | 3/2000 |

* cited by examiner

RADIOTELEPHONE

BACKGROUND OF THE INVENTION

This invention relates to a radiotelephone, and in particular a removable housing for a radiotelephone.

It has become desirable for users of radiotelephones to replace a broken or scratched housing of a radiotelephone easily without requiring any special training or tools. Also, users of radiotelephones may want to change the appearance of their radiotelephone by replacing its housing with another of a different appearance.

Known removable front covers for radiotelephones have a latching element formed from the front cover moulding that engages with an aperture on a rear housing of the radiotelephone. The removal of this type of front cover is a two handed operation requiring a user to, first, use one hand to disengage the latching element from the rear housing aperture then, due to the frictional force that exists between the latching element and the rear housing, use a second hand to remove the front cover from the rear housing.

It is desirable to improve this situation.

SUMMARY OF THE INVENTION

According to an aspect of the present invention there is provided an electronic radiotelephone comprising a first and second housing for housing the electronic components of the radiotelephone; the first housing having an element with an operating surface and a formation arranged to co-operate with a complementary formation on the second housing for releasably attaching the first housing to the second housing; the element being movable between a first and a second position such that when the element is in the first position the formation and complementary formation are arranged to co-operate to allow the first housing to be coupled to the second housing and when in the second position allow the second housing to be removed from the first housing; the element being resiliently biased into the first position and arranged to allow a user to urge the element, via the operating surface, into the second position during the removal of the second housing from the first housing, thereby allowing the second housing to be removed from the first housing without interference from the element.

This provides the advantage of allowing the second housing to be removed from the first housing without interference from the first housing, thereby allowing easy removal of the second housing from the first housing.

Preferably the first housing is presented away from a user during operation of the radiotelephone and the second housing is presented towards a user during operation of the radiotelephone.

Suitably the radiotelephone further comprises retaining means for retaining the electronic components of the radiotelephone to the first housing.

Preferably the element is a flexible hinge.

Most preferably the radiotelephone further comprises means for urging the second housing away from the first housing to aid the removal of the second housing from the first housing.

This allows the second housing to be moved away from the first housing on movement of the element from the first to the second position without requiring a user to handle the second housing. This allows the second housing to be removed from the first housing in response to a single operation.

BRIEF DESCRIPTION OF THE DRAWINGS

For a better understanding of the present invention and to understand how the same may be brought into effect reference will now be made, by way of example only, to accompanying drawings, in which.

DETAILED DESCRIPTION OF THE INVENTION

Figure 1:
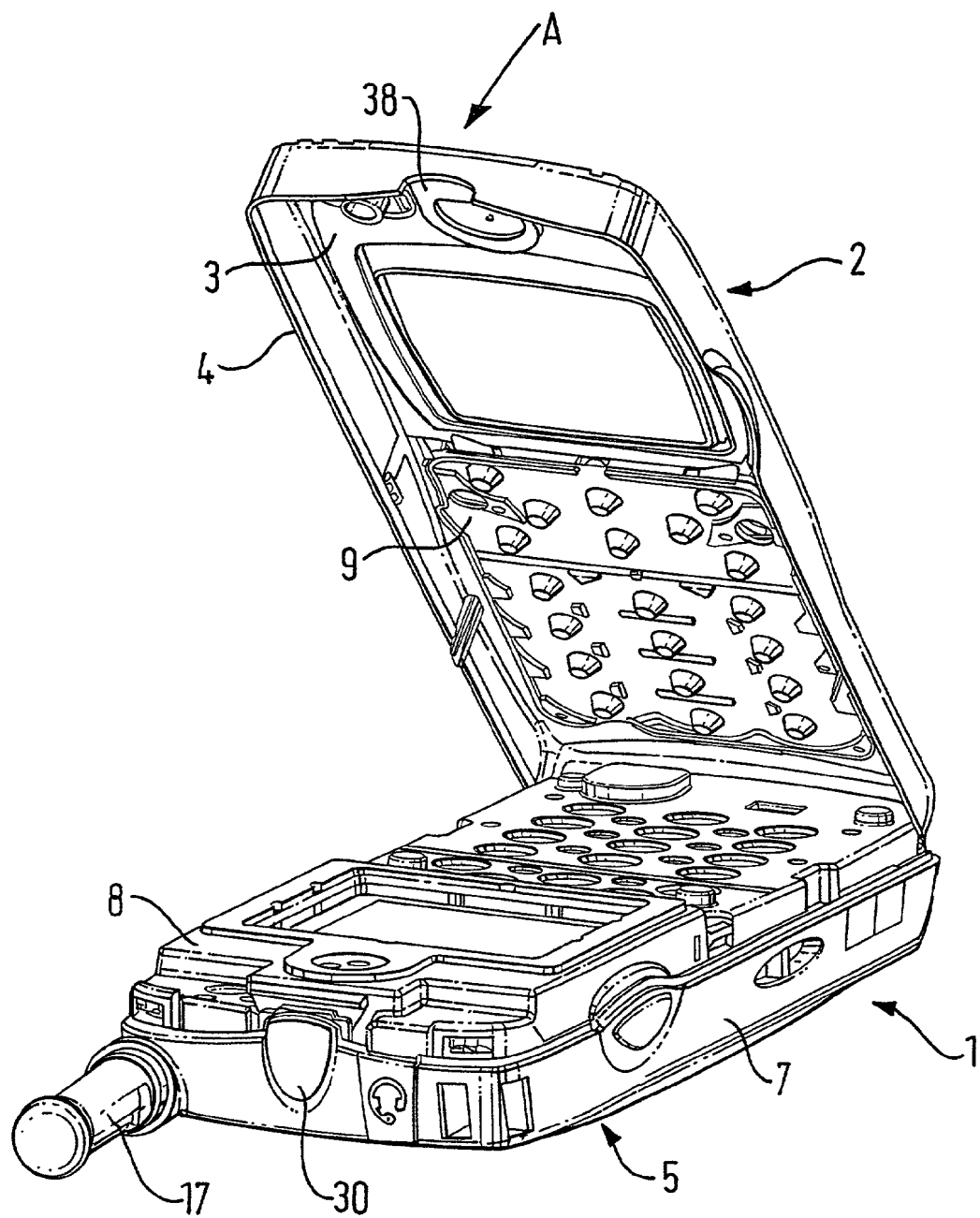
FIG. 1 shows a radiotelephone according to an embodiment of the present invention.

FIG. 1 shows a radiotelephone 1 having a shell shaped first housing 2, otherwise referred to as a front cover, having a front wall 3 integral with side walls 4; a second housing 5, otherwise referred to as a rear cover, having a rear wall 6 integral with side walls 7; and an inner housing 8. Sandwiched between the front cover 2 and inner housing 8 is a keymat 9. The inner housing 8 is coupled to the rear cover 5, as described below.

Figure 2:
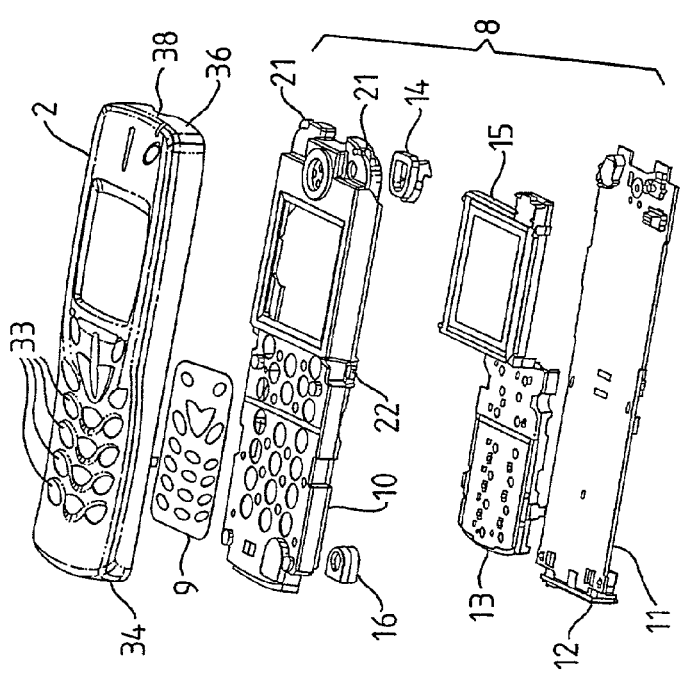
FIG. 2 shows an exploded view of the radiotelephone of FIG. 1.
Figure 2:
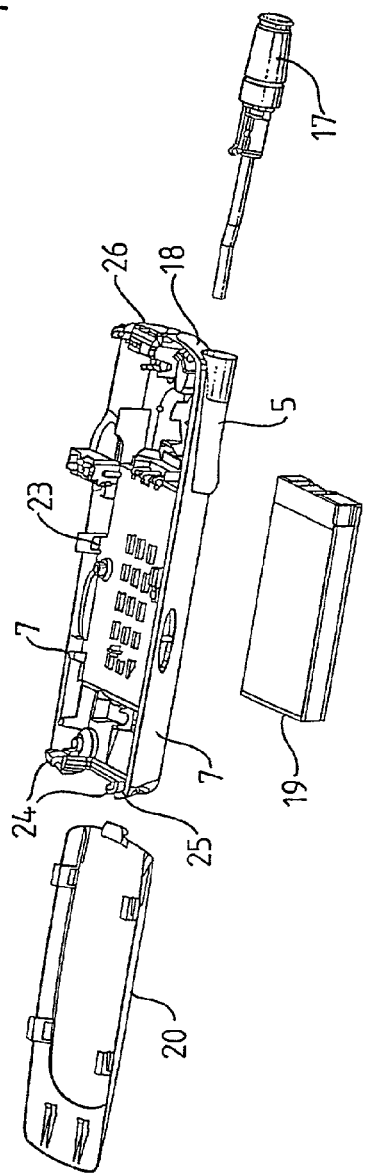

FIG. 2 shows the mechanical structure of the radiotelephone 1. A keymat 9 is snapped on and off the inner side of the front cover 2. The main purpose of the keymat 9 is to act as an interface between the user and the functions of the radiotelephone 1. The inner housing 8 comprises an inner cover 10, a main circuit board 11, a system connector 12, a dome sheet 13, a speaker 14, a microphone 16 and a liquid crystal display 15. The inner cover 10 is arranged to snap fit to the main circuit board 11. The main circuit board 11, which provides the main functionality of the radiotelephone 1, is coupled to the system connector 12, the dome sheet 13 which transforms the movement of the keys into an electrical connection on the circuit board 11, the speaker 14, the microphone 16 and the liquid crystal display 15.

An antenna 17 is coupled to the rear cover 5 via an aperture in the upper transverse sidewall 18. The rear wall 6 of rear cover 5 has a recess (not shown) for receiving a battery 19. The battery 19 provides the power required to operate the radiotelephone 1. A battery cover 20 is arranged to snap fit to the rear cover 5 to enclose the battery 19, as is well known to a person skilled in the art.

The inner housing 8 is attached to the rear cover 5 via attaching lugs 21 and lugs 22, which are arranged to snap fit into complementary apertures (not shown) on the rear cover 5 and into complementary recesses 23 on the rear cover 5 respectively. However, other attachment means may be used for coupling the inner housing 8 to the rear cover 5, for example screws, rivets.

The lower side-wall 24 of the rear cover 5, transverse to the longitudinal axis of the rear cover 5, has a cut away section for receiving the system connector 12.

On either side of the cut away of the side wall 24 are grooves 25 arranged for coupling the rear cover 5 to the front cover 2, as described below.

The upper side-wall 18 of the rear cover 5, transverse to the longitudinal axis of the rear cover 5, has a U shaped cut away for operation of a release element 26, otherwise known as a release button.

Figure 3:
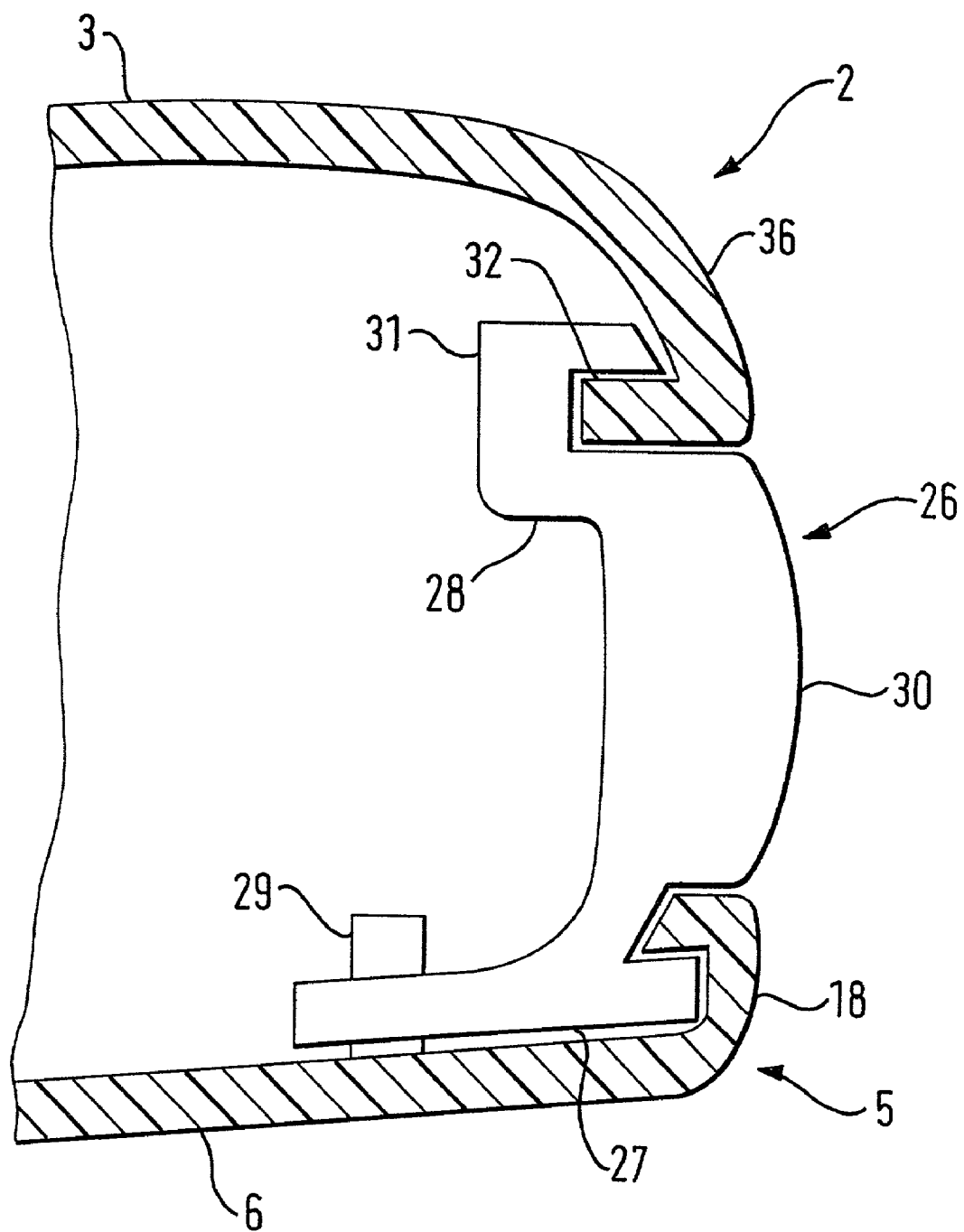
FIG. 3 shows a cross-section through part of the housing of FIG. 1.

The release button 26 is a right angled shaped element made out of a resilient material, for example plastic. The release button 26, as shown in cross-section in FIG. 3, has a lower section 27 and an upper section 28. The lower section 27 is coupled to the rear wall 6 of the rear cover 5 via an attachment stud 29. The release button 26 can be attached to the rear wall 6 by any suitable means, for example welding, riveting. The release button is a flexible hinge, whereby the resilient material allows the upper section 28 to pivot relative to the lower section 27.

The upper section 28 of the release button 26 is biased against the upper wall 18 of the rear cover 5. The upper section 28 comprises an operating portion 30 and a latching portion 31. The operating portion 30 projects outwardly to form an extended surface. The extended surface extends into the U shaped cut away on the upper wall 18 of the rear cover 5. The extended surface allows a user to apply pressure, via a user's finger or thumb, to the release button 26, thereby allowing a user to urge the upper section 28 of the release button 26 away from the upper wall 18. The extended surface, otherwise known as operating surface, has, substantially, the same contour as the surrounding upper wall of the rear cover.

The latching portion 31 is formed above the operating portion 30, relative to the rear wall 6. The latching portion 31 forms a ridge that is arranged to engage with a complementary lip 32 on the front cover 2, as described below.

The front wall 3 of the front cover 2 has a plurality of apertures 33 through which components inside the housings partially project. The apertures 33 can be provided for, for example, push button keys, a display device or a loudspeaker device/microphone device. The side-walls 4 are arranged to match the corresponding side walls 7 on the rear cover 5 when the rear and front covers are attached.

The lower end-wall 34, transverse to the longitudinal axis of the front cover, has a cut away section (not shown) for accommodating the upper part of the system connector 12. On either side of the cut away section, located on the inner side of the end wall 34, are attaching lugs (not shown) that co-operate with the corresponding grooves 25 on the rear cover 5 for coupling the first and rear covers, as described below.

The upper end-wall 36, transverse to the longitudinal axis of the front cover, has a U shaped cut away section 38 for accommodating the upper part of the operating surface of the release button 30. Located above the cut-away section, on the inner side of the end-wall 36 is a lip 32 that co-operates with the ridge on the latching portion 31 of the release button 26 for coupling the front and rear covers, as described below.

Figure 4A:
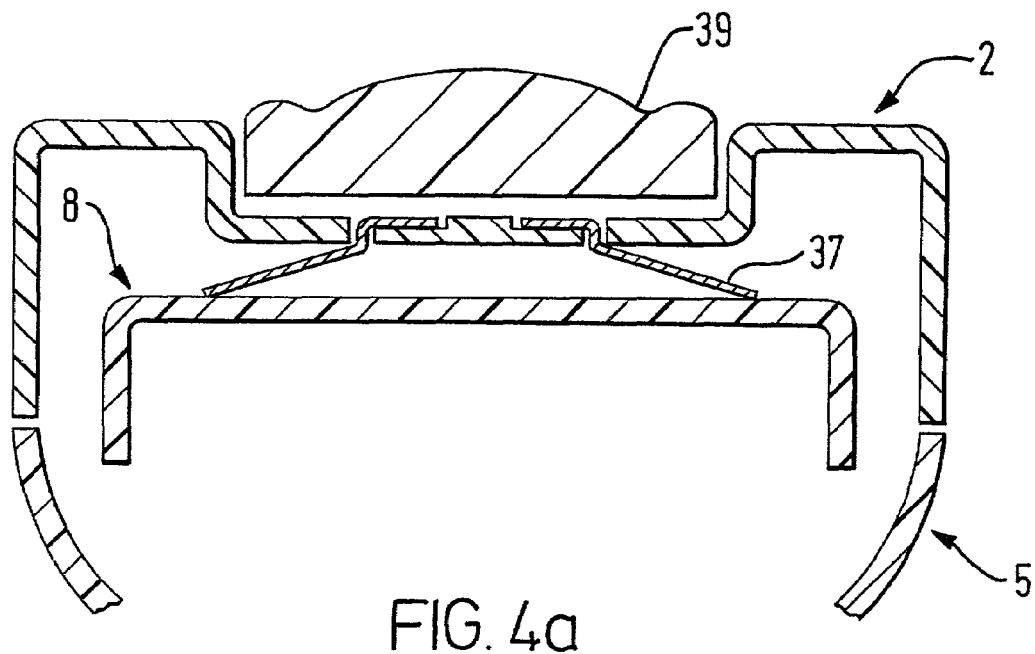
FIG. 4a shows a cross-section through a second part of the housing of FIG. 1 with the front and rear housings attached.
Figure 4B:
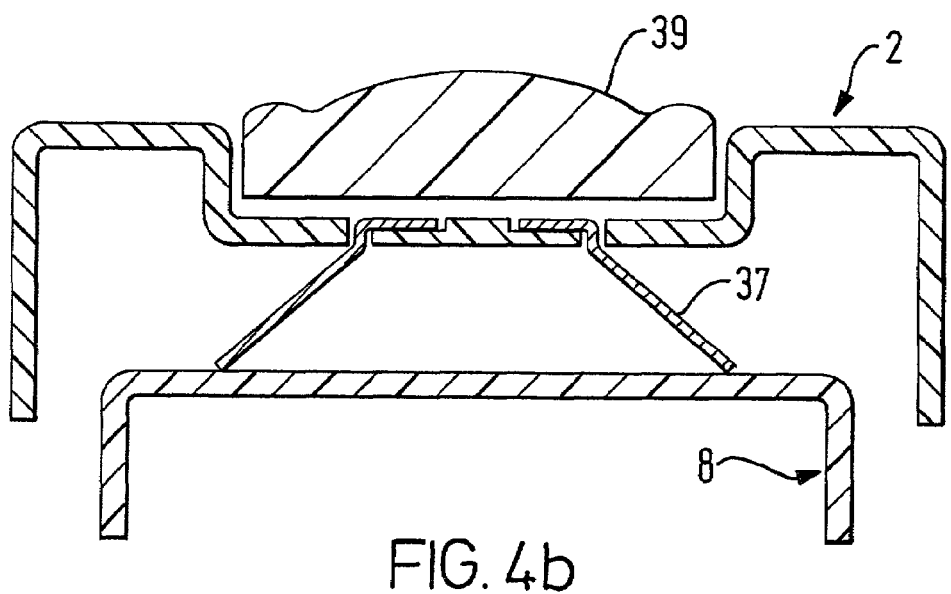
FIG. 4b shows a cross-section through a second part of the housing of FIG. 1 with the front and rear housings detached.

FIG. 4a and 4b shows a modification to the above described radiotelephone in which a leaf spring 37 is coupled to the inside of the front wall 3 of the front cover 2. In addition, the leaf spring is located below a protective window 39, wherein the window 39 is for viewing the display 15. The leaf spring 37 is arranged to be compressed by the inner housing 8 when the front and rear covers are attached, as shown in FIG. 4a. The leaf spring 37 provides spring bias between the front and rear covers. The spring bias between the front and rear covers is provided transverse to the longitudinal axis of the covers to allow the front cover 2 to be urged away from the rear cover 5 uniformly on a transverse plane, as shown in FIG. 4b. However, any type of spring may be used that urges the front cover away from the rear cover. Alternatively, however, the spring may be coupled to either the rear cover or inner housing and arranged to urge the front cover away from the rear cover when the front and rear covers are attached.

To attach the front cover 2 to the rear cover 5 the lugs (not shown) on the lower wall 34 of the front cover 2 are brought into contact with the grooves 25 on the lower wall 24 of the rear cover 5, as shown in FIG. 1, thereby allowing the lugs to engage with grooves 25. The upper part of the front cover 2 is moved towards the upper part of the rear cover 5, as shown by direction A in FIG. 1, overcoming spring bias of spring 37 as spring 37 is urged against the inner housing 8. As the upper part of the front cover 2 is brought into contact with the upper part of the rear cover 5 the lip 32 is brought into contact with the latching portion 31 of the release button 26. The lip 32 and latching portion 32 of the release button 26 are arranged so that on urging the lip 32 and latching portion 31 together the lip 32 causes the release button 26 to be urged inwards, away from the upper side wall 18 of the rear cover 5, until the lip 32 enters the ridge on the latching portion 31 of the release button 26, thereby latching the front cover 2 to the rear cover 5. Alternatively, a user may urge the release button 26 away from the upper side wall 18 of the rear cover 5 while bringing the front and rear covers together, thereby coupling, on release of the release button 26, the front and rear covers.

To remove the front cover 2 from the rear cover 5 the release button 26 is urged away from the upper side wall 18 of the rear cover 5, typically using a user's finger or thumb, thereby releasing contact between the lip 32 and release button 26. The spring bias of spring 37 urges the upper portion of the front cover 2 away from the upper portion of the rear cover 5 to allow the front cover 2 to be removed from the rear cover 5.

The present invention may include any novel feature or combination of features disclosed herein either explicitly or implicitly or any generalization thereof irrespective of whether or not it relates to the presently claimed invention or mitigates any or all of the problems addressed.

In view of the foregoing description it will be evident to a person skilled in the art that various modifications may be made within the scope of the invention. For example, it will be appreciated that the release button 26 may be formed from the rear cover 5 or a rubber seal may be used in place of a spring for urging the front cover away from the rear cover when the front and rear covers are attached, wherein the rubber seal may be coupled to either the front cover, the rear cover or the inner housing.

What is claimed is:

1. An electronic radiotelephone comprising a first and a second housing for housing electronic components of the radiotelephone and a biasing mechanism to aid a user to release the second housing from the first housing;

the first housing having an element, with an operating surface, and a formation which co-operates with a complementary formation on the second housing for user releasable coupling of the first housing and the second housing; the element being movable between a first and a second position such that when the element is in the first position the formation and complementary formation co-operate to allow the first housing to be coupled to the second housing and when the element is in the second position to allow the second housing to be removed from the first housing by the user;

wherein the biasing mechanism comprises a compression biased releasing mechanism and a compression biased urging mechanism, the compression biased releasing mechanism being arranged to resiliently compression bias the element into the first position to allow a user to actuate the element, via the operating surface, against the compression bias into the second position to release the co-operation of the formation and complementary formation thereby allowing the housings to be removed from one another, and wherein the compression biased urging mechanism is arranged to be in resilient compression to store energy when the formation and complementary formation are coupled and to automatically urge the first and second housings away from each other when the coupling of the formation and the complementary formation are released by releasing energy stored in the compression biased urging mechanism.

2. A radiotelephone according to claim 1, wherein the first housing is presented away from a user during operation of the radiotelephone and the second housing is presented towards a user during operation of the radiotelephone.

3. A radiotelephone according to claim 1 comprising a retaining mechanism for retaining the electronic components of the radiotelephone to the first housing.

4. A radiotelephone according to claim 1, wherein the second housing has a lip for engaging with the element to allow the first housing to be coupled to the second housing.

5. A radiotelephone according to claim 1, wherein the element is a flexible hinge.

6. A radiotelephone according to claim 1, wherein the first housing further comprises a retaining mechanism for retaining the electronic components of the radiotelephone to the second housing.

7. A radiotelephone according to claim 1, wherein the compression biased urging mechanism comprises a spring associated with the first housing which is compressed when the first and second housings are coupled.

8. A radiotelephone according to claim 1, wherein the compression biased urging mechanism comprises a spring associated with the second housing which is compressed when the first and second housings are coupled.

9. A radiotelephone according to claim 1, wherein the compression biased urging mechanism comprises a rubber seal associated with the first housing which is compressed when the first and second housings are coupled.

10. A radiotelephone according to claim 1, wherein the compression biased urging mechanism comprises a rubber seal associated with the second housing and which is compressed when the first and second housings are coupled.

11. A radiotelephone is accordance with claim 1, comprising:
an interior volume disposed between the first and second housings which houses electronic components of the radiotelephone.

12. A radiotelephone according to claim 1 wherein the compression biased urging mechanism is elastically deformable.

13. An electronic radiotelephone comprising a first and a second housing means for housing electronic components of the radiotelephone and a biasing mechanism to aid a user to release the second housing from the first housing;
the first housing means having an element, with an operating surface, and a formation which co-operates with a complementary formation on the second housing means for user releasable coupling of the first housing means and the second housing means; the element being movable between a first and a second position such that when the element is in the first position the formation and complementary formation co-operate to allow the first housing means to be coupled to the second housing means and when the element is in the second position to allow the second housing to be removed from the first housing means by the user;
wherein the biasing mechanism comprises a compression biased releasing mechanism and a compression biased urging mechanism, the compression biased releasing mechanism being arranged to resiliently compression bias the element into the first position to allow a user to actuate the element, via the operating surface, against the compression bias into the second position to release the cooperation of the formation and complementary formation thereby allowing the housings to be removed from one another, and wherein the compression biased urging mechanism is arranged to be in resilient compression to store energy when the formation and complementary formation are coupled and to automatically urge the first and second housings away from each other when the coupling of the formation and the complementary formation are released by releasing energy stored in the compression biased urging mechanism.

* * * * *